3,318,620
HOSE END COUPLING
Roy H. Cullen, Charles H. Elliott, Leslie D. Richards, Jimmie R. Aker, and William E. Burke, Houston, Tex., assignors to Roy H. Cullen, Houston, Tex.
Filed Oct. 22, 1965, Ser. No. 501,031
6 Claims. (Cl. 285—149)

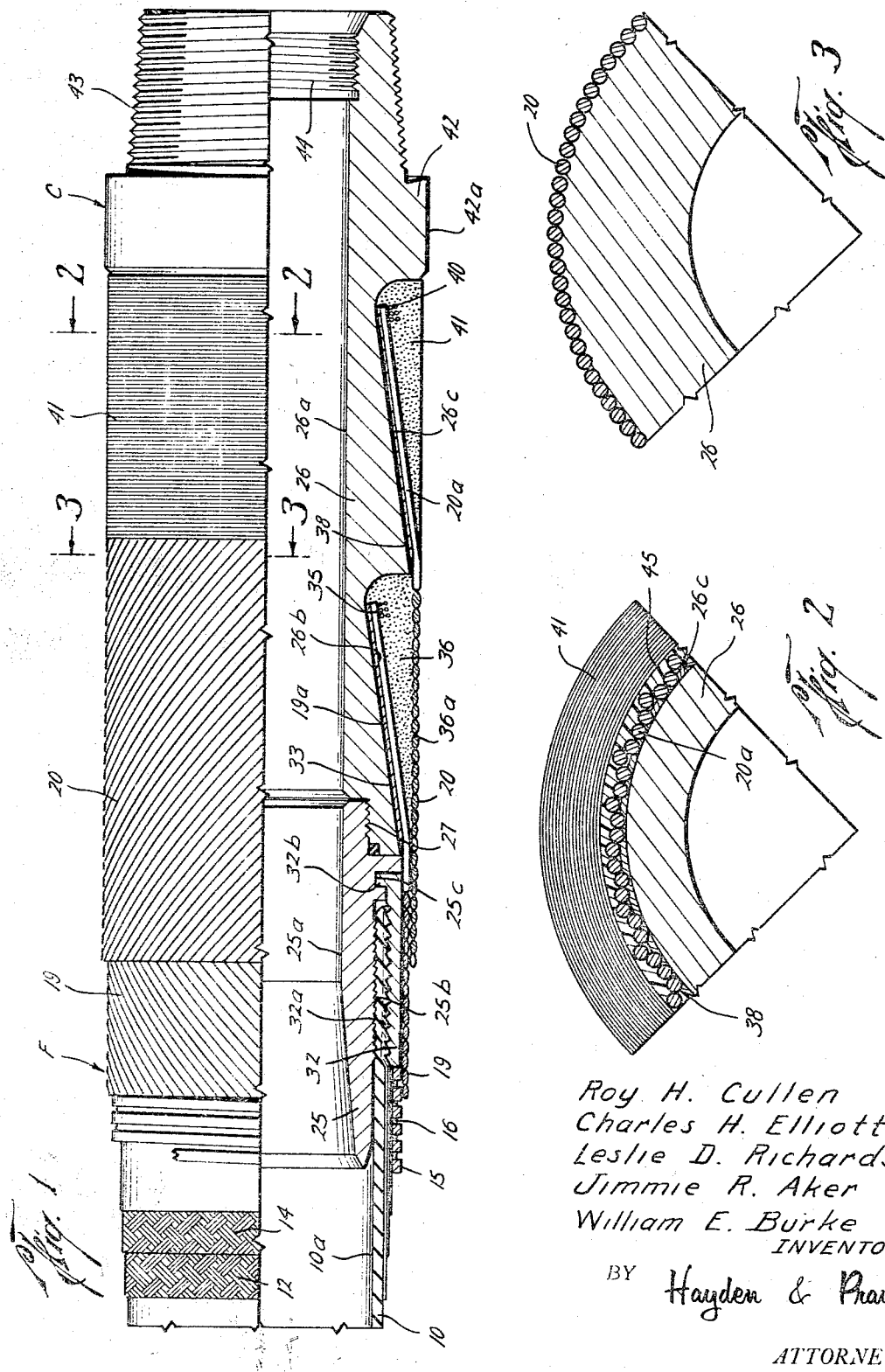
Roy H. Cullen
Charles H. Elliott
Leslie D. Richards
Jimmie R. Aker
William E. Burke
INVENTORS
BY Hayden & Pravel
ATTORNEYS

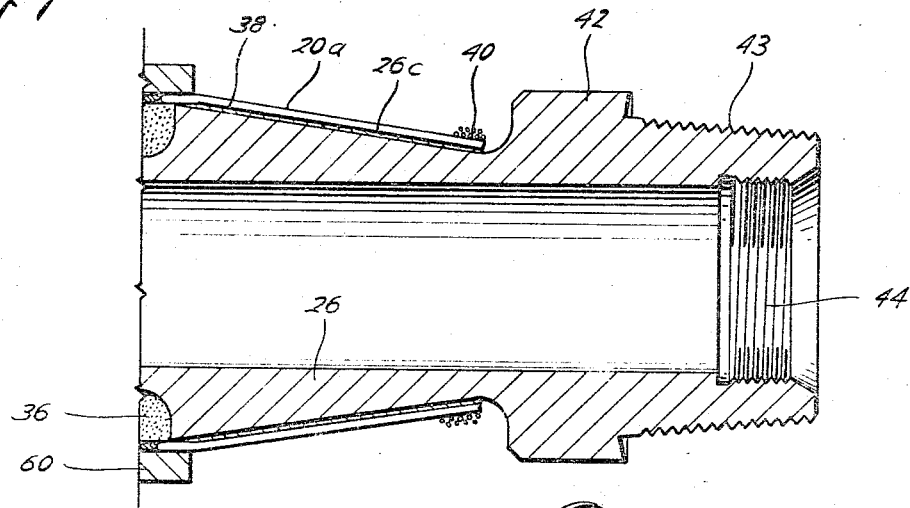
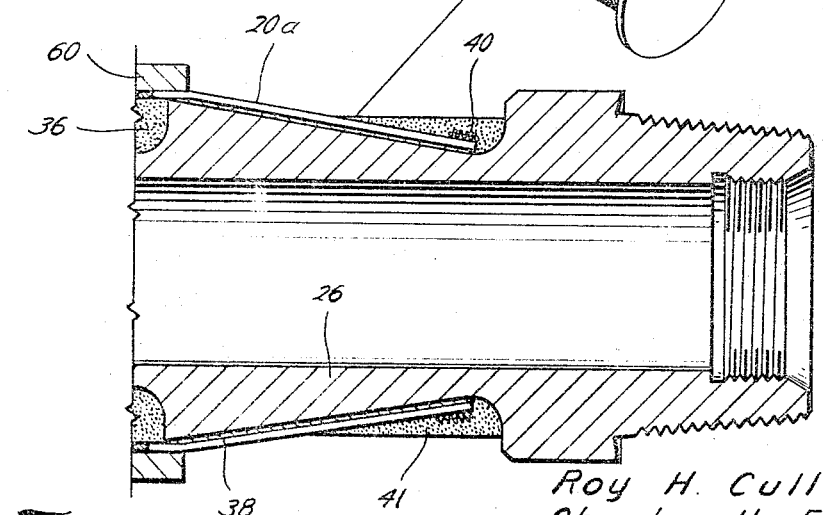

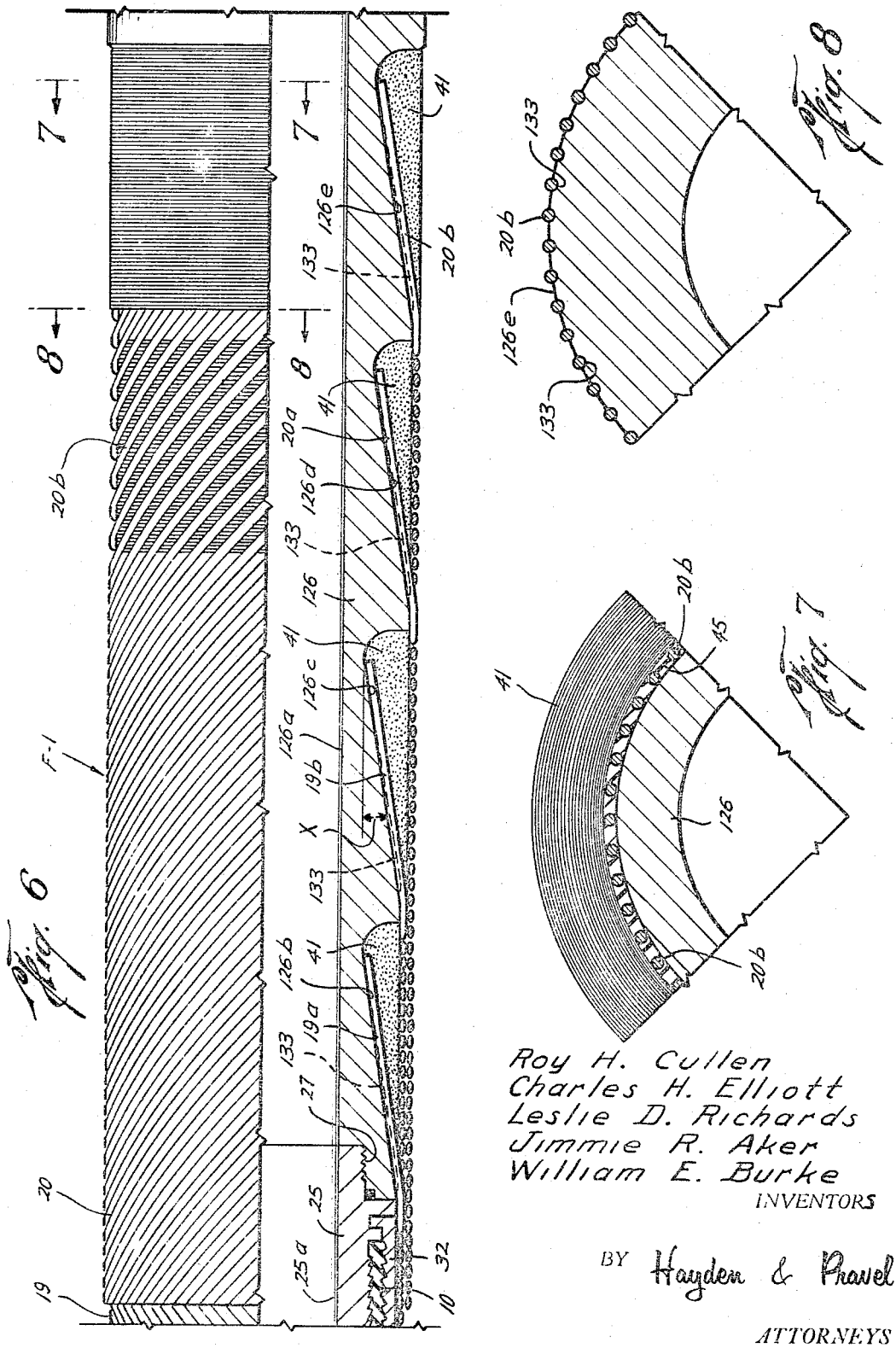

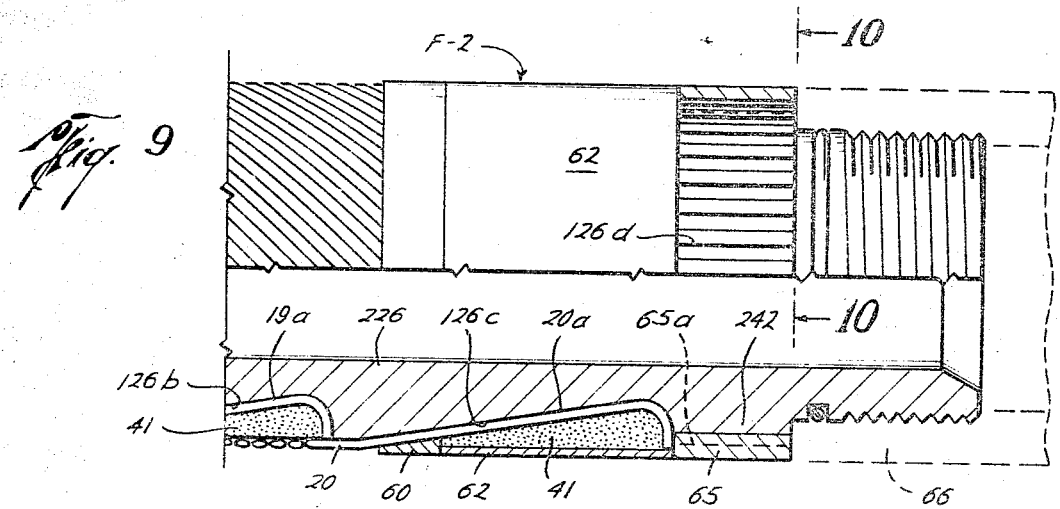
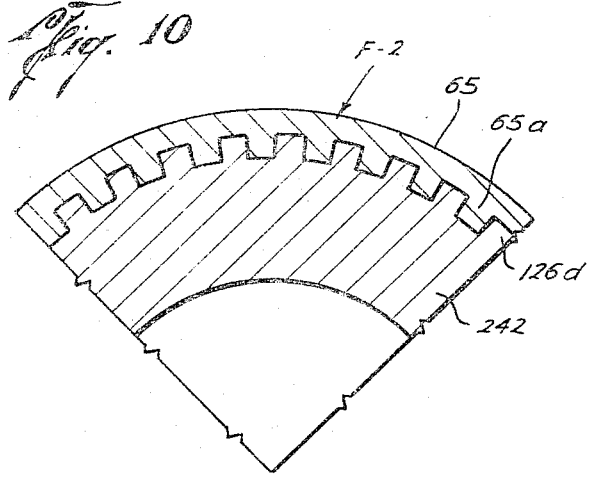
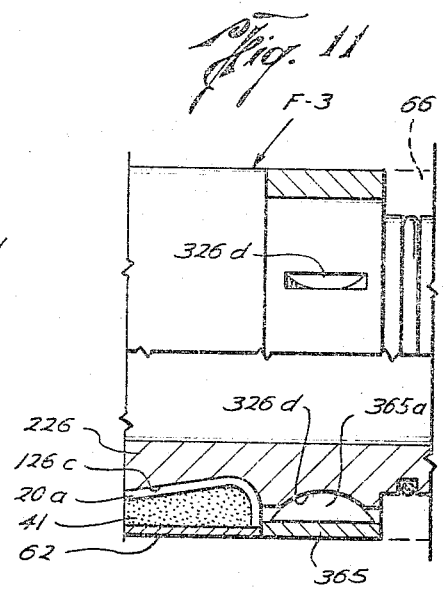
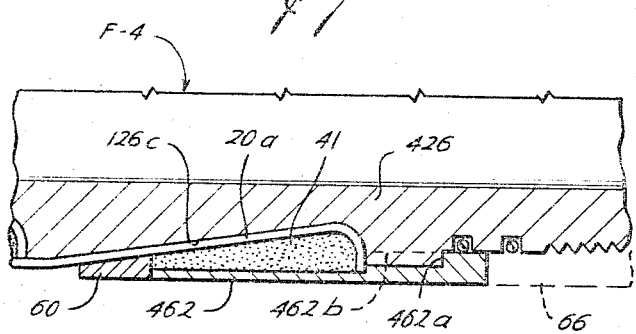
Roy H. Cullen
Charles H. Elliott
Leslie D. Richards
Jimmie R. Aker
William E. Burke
INVENTORS
BY Hayden & Pravel
ATTORNEYS United States Patent Office 3,318,620
Patented May 9, 1967

ABSTRACT OF THE DISCLOSURE

An end coupling for a flexible pipe wherein at least one layer of helically wrapped armor wires is held over a tapered coupling surface by substantially circularly wrapped wire bonded together to form a solid ring.

In United States Patent No. 3,004,779 a wrapped pressure hose is disclosed which is suitable for use as a flexible pipe in drilling wells and similar operations. Such hose or flexible pipe has outer helically wound wires or armoring thereon to protect the flexible fluid conductor and to provide end pull strength and torque resistance. The wire wrapping or armoring has been held in place at the ends of each section of the hose or flxible pipe with swage rings, the installation of which requires relatively expensive swaging equipment as well as precise machining tolerances with respect to the swage rings.

An object of this invention is to provide a new and improved end coupling which has all of the advantages of the coupling disclosed in said Patent No. 3,004,779, and in addition thereto, has comparable or greater strength without requiring the relatively expensive swaging equipment needed for manufacturing the end coupling of said Patent No. 3,004,779.

Another object of this invention is to provide a new and improved end coupling for a flexible pipe or hose having a plurality of helically wound layers of armor wire, and method of making same, wherein the ends of the armor wire are secured on an end coupling body by circularly disposed holding wire which has a bonding agent such as an epoxy resin therewith for unitizing the holding wire.

The preferred embodiment of this invention will be described hereinafter together with other features thereof, and additional objects will become evident from such description.

The invention will be more readily understood from a reading of the following specification and by reference to the accompanying drawings forming a part thereof, wherein an example of the invention is shown and wherein:

FIG. 1 is a view, partly in elevation, and partly in section, illustrating the preferred form of the end coupling of this invention;

FIG. 2 is a quarter section taken on line 2—2 of FIG. 1 to illustrate details with respect to the embodiment shown in FIG. 1;

FIG. 3 is a quarter section taken on line 3—3 of FIG. 1 to illustrate further details of the present invention;

FIG. 4 is a sectional view of a portion of the end coupling of the present invention illustrating an intermediate step in the method of manufacture of such coupling;

FIG. 5 is a view similar to FIG. 4 but illustrating another step in the manufacture of the end coupling of this invention;

FIG. 6 is an elevation, partly in section, of a modified form of the end coupling of this invention;

FIG. 7 is a quarter section taken on line 7—7 of FIG. 6;

FIG. 8 is a quarter section taken on line 8—8 of FIG. 6;

FIG. 9 is an elevation, partly in section, of a portion of the end coupling of FIG. 6, with certain modifications;

FIG. 10 is a quarter section taken on line 10—10 of FIG. 9;

FIG. 11 is an elevation, partly in section, illustrating still a further modification of the end coupling of this invention; and FIG. 12 is a vertical quarter section illustrating still another modification of the end coupling of this invention.

In the drawings, the letter F designates generally a flexible pipe or hose which is particularly suitable for supporting fluid-driven drill bits (not shown). At the end of each section of the flexible pipe or hose F, a coupling C is provided for connecting the lengths or sections of the flexible pipe F together to form a continuous support or hose which is adapted to be lowered into a well bore.

As illustrated in the drawings, the flexible pipe or hose F includes an inner tube or fluid conductor 10 which is formed of rubber or any similar elastic resilient material and which serves as the main conduit through which the fluid flows during the use of the flexible pipe or hose F. In order to provide for burst strength, the inner tube or flow conductor 10 is surrounded by a two-ply wire braid which includes the wire braid layers 12 and 14 which are of conventional construction. A coil spring 15 surrounds the wire braid layer 14, and such spring 15 is formed of metal and is wound in a right-hand direction, with an elastomer filler 16 between the layers making up the coil 15. Although the coil 15 is preferably made of a resilient substantially rigid metal, it can be formed of other material so long as the material provides burst strength and serves to prevent crushing or collapsing of the coil 15 when the flexible pipe or hose F is gripped by grippers in an apparatus such as illustrated in United States Patent No. 2,892,535.

The coil spring 15 is surrounded by a plurality of helically wound wires 19 which extend in a left-hand direction and which are provided primarily for end pull strength. Such wires 19 are preferably wound at an angle of about 30° with respect to the vertical axis or longitudinal axis of the flexible pipe or hose F. A second outer layer of wires 20 surrounds the first outer layer of wires 19, and such wires 20 preferably extend at an angle of about 30° with respect to the vertical or longitudinal axis of the hose F but in a right-hand direction so that they extend in an opposite direction from the wires 19. The wires 20 provide for end pull strength, but they also provide for torque resistance. The wires 19 and 20 are referred to herein as armor wires since they serve to also protect the internal portions of the flexible pipe or hose F during use. Preferably, the outer layer of armor wires 20 serves as the outer covering for the flexible pipe or hose F, but an outer covering of rubber or similar resilient material (not shown) could be included over the armor wires 20 if so desired.

As seen in FIG. 1, the coupling C includes a nipple 25 and a body section 26 which are threaded together at mating threads 27 to form a unitary assembly. The central bores 25a and 26a of the members 25 and 26, respectively, are in communication with the bore or interior 10a of the inner tube or fluid conductor 10.

The inner conductor 10 and the wire braid layers 12 and 14 are clamped on the nipple 25 by a clamping ring 32 which has buttress teeth 32a formed on the inner surface thereof for engagement with the outer layer 14. The nipple 25 preferably has similar buttress teeth 25b formed on its external surface and which engage the inner surface of the end of the fluid conductor 10 so as to confine the ends of the conductor 10 and the wire braid layers 12 and 14 between the buttress teeth 25b and 32a. An inwardly extending annular flange 32b on the clamping ring 32 fits into a circumferential groove 25c formed on the external surface of the nipple 25 to thereby retain the ring 32 against longitudinal movement relative to the nipple 25. The ring 32 can be of any conventional type which is adapted to be compressed for applying a clamping action to the layers 10, 12, and 14; but preferably the ring 32 is a solid ring which is formed of metal or other material which retains itself in a compressed condition and is applied by swaging prior to the disposition of the armor layers 19 and 20 thereon in manufacture.

As will be explained more in detail in connection with the description of the method or process for the manufacture of the end coupling C of this invention, the ends of the armor wires 19 which are designated 19a are disposed on a downwardly and outwardly tapered annular surface 26b which preferably has a layer of zinc or other embedding material 33 formed thereon. The ends 19a of the armor wires 19 are held in position on the tapered surface 26b by an initial retaining band or set of wires 35 and by wire 36 which is circumferentially or circularly wound around the ends 19a. As will be explained more in detail, a viscous liquid or semisolid resin, such as epoxy resin, is applied during the process of manufacture so as to fill the spaces between the ends of the wires 19a and so as to coat and unify the wires 36. The external diameter 36a of the wire 36 conforms to the internal diameter of the outer layer of armor wires 20 as best seen in FIG. 1.

The ends 20a of the armor wires 20 are disposed on a surface 26c which is similar to surface 26b and is likewise tapered downwardly and outwardly with respect to the longitudinal axis of the flexible pipe or hose F. Preferably, a layer of zinc or other embedding material 38 is disposed between the ends of the wires 20a and the surface 26c for providing torque resistance, as will be explained more in detail hereinafter. The ends 20a are held in position in the same manner as the ends 19a, preferably by a retaining band 40 and wire 41 which is circularly or circumferentially wound around the ends 20a in the same manner as the wires 36.

The final external surface of the wires 41 with the epoxy resin or similar coating therewith is preferably of substantially the same diameter as the external surface of the armor wires 20. The end coupling C has a radial flange 42 with an external surface 42a which conforms generally with, but is preferably slightly larger in diameter than, the external diameter of the wire 41 and the armor wires 20. Threads 43 are formed on the body 26 of the coupling C for connection with a female connector or other suitable connecting means to join several of the hose sections together to form a continuous flexible pipe for various depths in drilling operations. Internal threads 44 are also provided for the mounting of suitable internal equipment which may be desired in the course of manufacture of the flexible pipe F or in connection with the use of the pipe P in a well or other location.

In carrying out the process or method of this invention, the ends 19a of the armor wires 19 are disposed on the surface 26b in the same manner as the ends 20a of the armor wires 20 are disposed on the surface 26c. Therefore, the following description with respect to the securing of the ends 20a on the surface 26c is applicable on the disposition of the ends 19a on the surface 26b. Reference is made to FIGS. 4 and 5 in particular which illustrate intermediate steps in the process or method of this invention for forming the final end coupling C of FIGS. 1–3.

The armor wires 20 are wrapped in a helical direction as best seen in FIG. 1 by any convenient or suitable armoring equipment. The ends 20a of the wires 20 are cut off so as to be of a proper length to fit on the external tapered surface 26c. A clamp 60 (FIGS. 4 and 5) of any conventional construction is disposed over the armor wires 20 at the upper maximum diameter portion of the tapered surface 26c so as to hold the ends 20a while laying them on the surface 26c. Thereafter, the ends 20a are then pressed radially inwardly by any suitable dies or rollers to force the ends 20a into the embedding layer 38 formed of zinc or other equivalent material. During such radial force on the ends 20a, the ends 20a are also straightened so as to lay substantially axially or longitudinally with respect to the longitudinal axis of the flexible pipe F. The embedding of the wires 20a in the embedding layer 38 disposes such wires in axial or longitudinal grooves to prevent a skidding or twisting of the wires when torque forces are created due to the action between the two armor layers 19 and 20 when an end pull is applied to the flexible pipe F. Instead of the zinc or other embedding layer 38, the surface 26c may be preformed with longitudinally extending grooves to receive the ends 20a of the armor wires 20 of the same torque resistance provided by the embedding layer 38.

With the ends 20a of the armor wires 20 thus bent to conform with the tapered surface 26c, they become bunched as illustrated in FIG. 2 of the drawing, and therefore such wires 20a are initially clamped or held at their extreme outer ends by any suitable type of ring such as the wire 40 which is relatively heavy wire wrapped around such extreme ends of the armor wires 20. Instead of the wire 40, a split lock ring or other clamping device may be employed, and such wire 40 or other clamping ring may be removed after the ends 20a are firmly secured with the retaining wire 41, as will be more evident hereinafter. Normally, however, the retaining wire or band 40 is left in its clamping position as illustrated in FIG. 4. The voids between the ends 20a of the armor wires 20 as best seen in FIG. 2 may be filled with an epoxy resin or other suitable bonding agent, which may thereby form a relatively smooth external surface 45 (FIG. 2) over the armor wire ends 20a. In some cases, the embedding layer 38 may itself form such external smooth surface 45 and may also be the material filling the voids between the overlapping and bunched ends 20a.

In any event, after the ends 20a of the armor wires 20 are laid in the position illustrated in FIGS. 4 and 5, the relatively fine high tensile strength holding or retaining wire 41 is wrapped circularly or circumferentially around the ends 20a to fill the space externally of the ends 20a and to provide a smooth external diameter which is substantially the same as the external diameter of the armor wires 20 and slightly smaller in diameter than the flange 42 (see FIG. 1). At intervals throughout the wrapping process with the wires 41, a bonding agent or coating material such as the epoxy resin referred to above is coated on the wires 41 to firmly unitize such wires and hold them in their desired position. The epoxy resin is applied as a liquid or semiviscous material as is well known, and thereafter such material hardens to unite all of the wire 41 into a unitary holding element in the form illustrated in FIGS. 1 and 2.

As schematically shown in FIG. 5, the wire 41 is fed from a spool 41a of any conventional or suitable construction; and such wire 41 is applied under tension to obtain the maximum retaining force on the ends 20a of the armor wire 20. After the wire 41 has filled the space together with the epoxy resin or other bonding agent so as to provide the relatively smooth external surface indicated in FIG. 1 of the drawings, the wire 41 is severed from the spool 41a and the resin is allowed to harden. After the resin has become set to a hardened condition, the clamp 60 is removed and the end coupling C is complete.

It will be appreciated that the above procedure is applicable to the securing of the ends of the armor wires 19 with the wire 36 and that the application of the wire 36 is generally completed before the armor wires 20 are applied.

In FIGS. 6–8, a modified flexible pipe or hose F–1 is illustrated wherein the armor wire layers 19 and 20 are mounted on a modified body section 126 in a manner to be explained. The body section 126 is connected to the nipple 25 in the same manner as the body section 26 is connected to the nipple 25 in FIG. 1, namely, with threads 27 or other suitable means. The bore 126a of the body section 126 is preferably in longitudinal alignment with the bore 25a of the nipple 25. The nipple 25 is connected to the hose 10 in the same manner as described and illustrated heretofore in connection with FIG. 1. Like parts in FIGS. 1 and 6 bear like numerals or other designations.

The body section 126 is provided with annular tapered surfaces 126b, 126c, 126d, and 126e. With the form of the invention illustrated in FIGS. 6–8, the bunching of the ends of the wires from the armor layers 19 and 20 such as is illustrated in FIG. 2 is eliminated. This is accomplished by disposing only the alternate ends 19a on the first surface 126b while disposing the other alternate ends 19b of the wires 19 on the next tapered surface 126c. Similarly, the alternate ends 20a of the wires 20 are disposed on the tapered surface 126d, and the other alternate ends 20b of the wires 20 are disposed on the tapered surface 126e. It is to be noted that each of the surfaces 126b, 126c, 126d, and 126e are provided with substantially axially or longitudinally extending grooves 133 (FIG. 8) into which the alternate wires are adapted to be disposed to assist in preventing any release of the ends of the wires upon a torque force being applied to the flexible pipe or hose F–1. Thus, as best seen in FIG. 8, the ends 20b are disposed in the grooves 133 which are preformed in the surface 126e. The same grooves 133 are provided on each of the other surfaces, and the corresponding ends 19a, 19b, and 20a are disposed in the same manner as illustrated for the wire ends 20b in FIG. 8.

The wire ends 20b are embedded in a layer of an epoxy resin of the same type as the resin or adhesive 45 previously described in connection with FIGS. 1 and 2. Thus, in FIG. 7, the epoxy resin 45 is illustrated as filling the spaces between the ends of the wires 20b. The wires 41 which are wrapped over the epoxy layer 45 and the wires 20b (FIG. 7) are also as described heretofore in connection with FIGS. 1, 2, and 5. Although the retaining wires 40 of FIGS. 1, 2, 4, and 5 are not illustrated in FIGS. 6 and 7, it will be understood that they may be employed if desired. In some cases, however, they may be eliminated; and for that reason, the modification of FIGS. 6 and 7 does not show such wires 40.

The wires 19a and 20a are mounted and would appear in cross section the same as the illustrations of FIGS. 7 and 8 if taken at the appropriate cross sectional cut line.

The method of attaching the ends 19a, 19b, 20a and 20b to the body member 126 may be basically as illustrated and described heretofore in connection with FIGS. 1–5, it being understood that the ends 19a are the first to be secured, and then the ends 19b are secured thereafter the same manner. When the ends 19a and 19b have been secured, the layer of wires 20 is wrapped over the layer of wires 19 and then the ends 20a are first secured and thereafter the ends 20b are secured, all employing the method heretofore described and the materials employed in connection with FIGS. 1–5.

FIG. 9 illustrates a further modification of the flexible pipe or hose F and it is designated F–2 in FIGS. 9 and 10. The flexible pipe F–2 has a body portion or cylinder 226 which corresponds with the body section 26 of FIG. 1, except that the flange 242 is modified, as will be explained, as compared to the flange 42 of FIG. 1. Also, the ends of the wires 19a and 20a are bent upwardly and outwardly as seen in FIG. 9. The layer wires 20 are disposed on the inclined surface 126c and the layer of wires 19a are disposed on the inclined surface 126b. The ends 19a of the wires 19 may be wrapped with wire 41 in the same manner as described in connection with FIG. 1, and also the ends of the wires 20a may be wrapped with the wire 41 as described in connection with FIG. 1. However, it is to be noted that the flexible pipe F–2 has an annular wedge shaped retaining ring 60 which has an external diameter substantially equal to the diameter of the layer wires 20 prior to their bending to conform with the surface 126c. A retaining sleeve of metal or the like indicated at 62 is slipped over the wires 41 to protect such wires 41 in use. The sleeve 62 is held in place by a retaining sleeve 65 which is formed with internal splines that coact with corresponding splines 126d on the body section 126. A suitable nut indicated in dotted lines at 66 holds the slidable retaining sleeve 65 in position on the body 226 as illustrated in FIG. 9.

In FIG. 11, a further modified flexible pipe F–3 is illustrated wherein the structure is identical to that illustrated in FIG. 9, except that the retaining sleeve 365 is secured to the body 226 by key elements 365a which are disposed in suitable keys 326d. Like parts in FIG. 11 which correspond with those in FIGS. 9 and 10 bear like numerals so that it can be seen that the structure of FIG. 11 is basically the same as that illustrated in FIGS. 9 and 10, except for the retaining sleeve 365.

FIG. 12 indicates a further modified flexible pipe or hose F–4 which has a sleeve 462 that is integral with a shoulder 462a to limit the movement of the sleeve 462 inwardly. The sleeve 462 also has suitable splines 462b which coact with the corresponding splines on the tubular body section 426 so as to prevent relative rotation between the sleeve 462 and the body section 426. The sleeve 462 is held in position by a retaining nut 66 indicated in dotted lines, or any other suitable retaining element.

Reference is now made to FIG. 6, wherein an angle X is illustrated with respect to the surface 126c. With the present invention, when the wires 41 are wrapped and bonded together with the epoxy resin in a manner illustrated and described heretofore in connection with FIGS. 1–5, and as employed in the other forms of the invention disclosed herein also, such wires 41 act as a solid ring and become a self-tightening ring under certain conditions of construction. The self-tightening feature of the wires 41 occurs when the coefficient of friction between the solid layer of wires 41 and the ends 19b is greater than the tangent of the angle X. Such construction causes the ring of wires 41 to ride with the wires 19 and the ends 19b thereof so as to wedge such ends 19b more tightly as end pull is exerted on the wires 19. Although the relationship between the ring of wires 41 and the wires 19b has been described specifically, it will be understood that the same condition for self-tightening may be related to the other wires 19a, 20a and 20b in the FIG. 6 form of the invention. Likewise, the same conditions will prevail with respect to the ring of wires 36 and the wire ends 19a in FIG. 1 and the ring of wires 41 and the wire ends 20a in FIG. 1.

Stated differently, the product of the inward radial forces produced by the application of the wires 41 on the wire ends 19b as viewed in FIG. 6 plus the outward radial forces generated by pulling the ring of wires 41 up the inclined surface provided for by 126c in FIG. 6, or combinations of the foregoing radial forces, multiplied by the coefficient of friction between the armor wire ends 19b and the inclined surface 126c must be at least equal to the end pull load applied to the wires 19b before the stresses in the enclosing wire ring provided by the wires 41 approach their elastic limit. Such relationship also exists with respect to the ends 19a, 20a and 20b in the various forms of the invention.

It should be understood that although certain figures illustrate particular modifications or embodiments of the present invention, such modifications or embodiments may be combined in various ways to form other embodiments within the scope of the present disclosure. For example, the wires 19a and 20a in FIG. 9 are shown as being curved upwardly and outwardly, and such feature is also usable in FIGS. 1 and 6, and other versions of the present invention. Likewise, the retaining sleeve 62 of FIGS. 9, 11 and the retaining sleeve 462 of FIG. 12 may be used in either of the modifications of FIGS. 1 and 6, or other combinations thereof. It should also be understood that although the form of the invention illustrated in FIGS. 1–3 includes the relatively soft embedding layer 33, such layer 33 may be formed as preformed grooves in the metal of the holding body section 26 in the same manner as illustrated in FIG. 6, and similarly, a soft embedding material may be disposed on the inclined surfaces 126b, 126c, 126d and 126e rather than providing the preformed grooves 133 as illustrated in FIGS. 6–8.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An end coupling for a flexible pipe having a tubular fluid conductor with at least one layer of armor wire thereon, comprising:
   (a) an end coupling body having an inner bore in communication with the bore of the tubular fluid conductor,
   (b) means connecting said end coupling body to the fluid conductor,
   (c) said end coupling body having an external annular surface which is tapered downwardly and outwardly with respect to the tubular fluid conductor and which is adapted to receive the ends of the layer of armor wires thereon,
   (d) a plurality of helically wrapped armor wires for end pull strength whose maximum inside diameter is approximately equal to the maximum outside diameter of the tapered surface,
   (e) the ends of the armor wires being disposed so as to conform generally to the taper of said external surface,
   (f) holding wire wrapped substantially circularly about the ends of the armor wires which are disposed over the tapered section to hold the armor wires against the tapered surface, and
   (g) bonding material within the spaces between the holding wire at the tapered section to unitize the holding wire into a solid ring having an inner inclined surface so that when the coefficient of friction between the unitized solid ring and the ends of the armor wire is greater than the tangent of the angle of the tapered surface with respect to axis of the coupling body self-tightening of the solid ring will occur if the armor wires start to move up the tapered surface.

2. The structure of claim 1, wherein:
   (a) the outer surface of the wrapped holding wire is substantially cylindrical and of substantially the same external diameter as the external diameter of the armor wires at the maximum diameter of the tapered surface.

3. The structure of claim 1, wherein:
   (a) said bonding material is an epoxy resin which hardens to unitize the holding wires.

4. The structure of claim 1, wherein:
   (a) the ends of said armor wires which are disposed on said tapered section are positioned substantially axially of the end coupling body, and
   (b) said ends of the armor wires are bunched at the smallest diameter portion of the tapered section.

5. The structure of claim 1, wherein:
   (a) said external surface has grooves in which the armor wires are disposed for torque resistance.

6. The structure of claim 1, wherein:
   (a) an embedding layer of relatively softer metal as compared to the metal of the coupling body is provided on said tapered surface for embedding the armor wires therein when held by said holding wire.

References Cited by the Examiner

UNITED STATES PATENTS

| | | | |
|---|---|---|---|
| 986,081 | 3/1911 | Patterson | 285—254 |
| 2,234,350 | 3/1941 | Muller | 285—149 |
| 2,237,490 | 4/1941 | Knowland | 285—149 |
| 2,878,038 | 3/1959 | Noland | 285—432 X |
| 2,940,778 | 6/1960 | Kaiser | 285—149 X |
| 3,004,779 | 10/1961 | Cullen et al. | 285—149 |

FOREIGN PATENTS 648,562   1/1951   Great Britain.

CARL W. TOMLIN, *Primary Examiner.*

THOMAS F. CALLAGHAN, *Examiner.*